(12) United States Patent
Engineer (10) Patent No.: US 9,714,603 B2
(45) Date of Patent: Jul. 25, 2017

(54) DUAL PRE-CHAMBER COMBUSTION SYSTEM

(71) Applicants: Hyundai Motor Company, Seoul (KR); Kia Motors Corporation, Seoul (KR); Hyundai America Technical Center, Inc., Superior Township, MI (US)

(72) Inventor: Nayan Engineer, Canton, MI (US)

(73) Assignees: Hyundai Motor Company, Seoul (KR); Kia Motors Corporation, Seoul (KR); Hyundai America Technical Center, Inc, Superior Township, MI (US)

( * ) Notice: Subject to any disclaimer, the term of this patent is extended or adjusted under 35 U.S.C. 154(b) by 36 days.

(21) Appl. No.: 14/338,527

(22) Filed: Jul. 23, 2014

(65) Prior Publication Data

US 2016/0024994 A1 Jan. 28, 2016

(51) Int. Cl.

| F02B 19/00 | (2006.01) |
|---|---|
| F02B 19/12 | (2006.01) |
| F02B 19/16 | (2006.01) |
| F02B 23/10 | (2006.01) |
| F02B 19/02 | (2006.01) |
| F02B 19/10 | (2006.01) |
| F02B 3/06 | (2006.01) |
| F02B 19/14 | (2006.01) |
| F02B 1/04 | (2006.01) |

(52) U.S. Cl.
CPC .......... *F02B 19/12* (2013.01); *F02B 19/1009* (2013.01); *F02B 19/1095* (2013.01); *F02B 19/16* (2013.01); *F02B 23/101* (2013.01); *F02B 1/04* (2013.01); *F02B 3/06* (2013.01); *F02B 19/02* (2013.01); *F02B 19/1004* (2013.01); *F02B 19/1014* (2013.01); *F02B 19/14* (2013.01); *Y02T 10/125* (2013.01)

(58) Field of Classification Search
CPC .. F02B 1/04; F02B 19/12; F02B 19/14; F02B 3/06; F02B 19/02
USPC .......................................................... 123/256
See application file for complete search history.

(56) References Cited

U.S. PATENT DOCUMENTS

| 2,657,677 A * | 11/1953 | Graves ...................... F02B 3/00 |
| | | 123/27 R |
| 3,955,362 A * | 5/1976 | Jones ........................ F01N 3/18 |
| | | 123/211 |
| 4,566,413 A | 1/1986 | Maly | |

FOREIGN PATENT DOCUMENTS

| JP | 54-022007 A | 2/1979 |
| JP | 07-026961 A | 1/1995 |
| JP | 11-324750 A | 11/1999 |

(Continued)

*Primary Examiner* — Hung Q Nguyen
*Assistant Examiner* — Charles Brauch
(74) *Attorney, Agent, or Firm* — Mintz Levin Cohn Ferris Glovsky and Popeo, P.C.; Peter F. Corless (57) ABSTRACT

In one embodiment, a combustion system for an engine is disclosed. The system includes a cylinder block that defines a cylinder bore and opposing pre-chambers located along a circumference of the cylinder bore. The system also includes a fuel injector located equidistant from the circumference of the cylinder bore that injects fuel in a direction perpendicular to a diameter of the cylinder bore. The system further includes spark plugs located within the pre-chambers that ignite at least a portion of the fuel from the fuel injector to direct ignition flames into the cylinder bore.

14 Claims, 6 Drawing Sheets

(56) References Cited

FOREIGN PATENT DOCUMENTS

| | | |
|---|---|---|
| JP | 2006-161736 A | 6/2006 |
| JP | 2012-241592 A | 12/2012 |
| KR | 2011-0126873 A | 11/2011 |

* cited by examiner

DUAL PRE-CHAMBER COMBUSTION SYSTEM

BACKGROUND (a) Technical Field

The present disclosure generally relates to a combustion system for an engine. In particular, a dual pre-chamber combustion system is disclosed that facilitates the use of a lean air-fuel mixture.

(b) Background Art

One byproduct of internal combustion within an engine is the formation of nitrogen oxide (NOx) gasses. These types of gasses are formed when nitrogen (N2) combines with oxygen (O2) under the high temperatures associated with the combustion process, thereby forming NOx gasses such as nitric oxide (NO) and nitrogen dioxide (NO2). These gasses can have a number of adverse environmental effects when released into the atmosphere. For example, acid rain, smog, ozone layer depletion, and other adverse environmental effects have been attributed to the release of NOx gasses into the atmosphere.

One way to reduce NOx gas production in a combustion engine is by using a sufficiently lean air-fuel mixture. In particular, the increased amount of air in a lean air-fuel mixture has the effect of decreasing the internal combustion temperatures of the engine, thereby lowering the formation of NOx gasses. However, the use of a lean air-fuel mixture is not without challenges. For example, running an overly lean air-fuel mixture in a traditional combustion engine can cause engine damage and "knocking," among other issues.

Some attempts have been made to support the use of lean and ultra-lean air-fuel mixtures in a combustion engine by making certain modifications to the engine. One such approach has been to use a stratified charge in a gasoline direct injection (GDI) engine. For example, a GDI wall guided design typically uses specialized contours on a piston to direct fuel injected from a side injector towards a centrally located spark plug. In other cases, indirect injection designs have been used in which a fuel injector and spark plug are both located within a pre-chamber, allowing combustion to begin in the pre-chamber and spread to the primary combustion chamber. However, such approaches require complex designs and may have only marginal effects on fuel economy.

In order to solve the problems in the related art, there is a demand for the development of a simplified combustion system that both reduces NOx gas emissions and improves fuel economy.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides systems and methods for providing combustion within an engine. In particular, techniques are disclosed herein that redirect fuel injected along a central axis of a cylinder bore towards pre-chambers located along the circumference of the cylinder bore.

In one embodiment, a combustion system for an engine is disclosed. The system includes a cylinder block that defines a cylinder bore and opposing pre-chambers located along a circumference of the cylinder bore. The system also includes a fuel injector located equidistant from the circumference of the cylinder bore that injects fuel in a direction perpendicular to a diameter of the cylinder bore. The system further includes spark plugs located within the pre-chambers that ignite at least a portion of the fuel from the fuel injector to direct ignition flames into the cylinder bore.

According to some aspects, the pre-chambers of the combustion system may include a plurality of apertures that direct the ignition flames into the cylinder bore. In one aspect, the apertures are each approximately one millimeter in diameter. In another aspect, the ignition flames from a particular pre-chamber may be spaced fifteen or more degrees apart. In a further aspect, the cylinder block of the combustion system may define a coolant jacket that at least partially surrounds the cylinder bore. In yet another aspect, the combustion system may include a piston located in the cylinder bore that directs the fuel from the fuel injector towards the pre-chambers. In some cases, the pre-chambers may be located along a circumference of the cylinder bore at locations that corresponds to a top dead center position of the piston.

In another embodiment, a method is disclosed in which an injection of fuel is injected by a fuel injector located centrally within a cylinder bore of an engine towards a crown of a piston located within the cylinder bore. At least a portion of the injection of fuel is received at opposing pre-chambers located along a circumference of the cylinder bore. The portion of the injection of fuel is also ignited within the pre-chambers to direct ignition flames into the cylinder bore.

In one aspect, the injection of fuel may be injected during a compression stroke in which the piston is moving towards a top dead center position in the cylinder bore. In another aspect, a crown of the piston may also be used to direct the injection of fuel towards the pre-chambers. In a further aspect, the crown of the piston may be used to force the injection of fuel into the pre-chambers as the piston nears the top dead center position. In yet another aspect, the injection of fuel may be a second injection of fuel, with the method further including injecting a first injection of fuel during an intake stroke in which the piston is moving away from the fuel injector in the cylinder bore. In one aspect, the intake stroke may occur prior to the compression stroke. In yet another aspect, the ignition flames may be directed from a particular pre-chamber are spaced at least fifteen degrees apart. In some aspects, the ignition flames may be used from the pre-chambers to ignite at least a portion of the first injection of fuel within the cylinder bore. In a further aspect, the method may also include providing cooling to the cylinder bore using a cooling jacket that at least partially surrounds the cylinder bore.

In another embodiment, a combustion system for an engine is disclosed. The system includes means for injecting fuel into a cylinder bore of the engine. The system also includes means for receiving at least a portion of the injected fuel. The system further includes means for igniting the received portion of the fuel to direct ignition flames into the cylinder bore.

In some aspects the combustion system may also include means for directing the injected fuel towards the receiving means, means for mixing air with the injected fuel, or means for cooling the cylinder bore.

Advantageously, the systems and methods described herein provide for the use of pre-chambers that allow a lean air-fuel mixture to be used during combustion.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present disclosure will be described so as to be easily embodied by those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention generally provides a combustion system and techniques whereby opposing pre-chambers are located along a circumference of a cylinder bore of an engine. A fuel injector located equidistant from the circumference injects fuel towards the center of the cylinder bore along an axis that is substantially perpendicular to the diameter of the cylinder bore. Combustion of the air-fuel mixture present in the chamber is initiated by igniting mixtures in the pre-chambers, thereby delivering directing ignition flames towards the mixture in the primary chamber.

Figure 1:
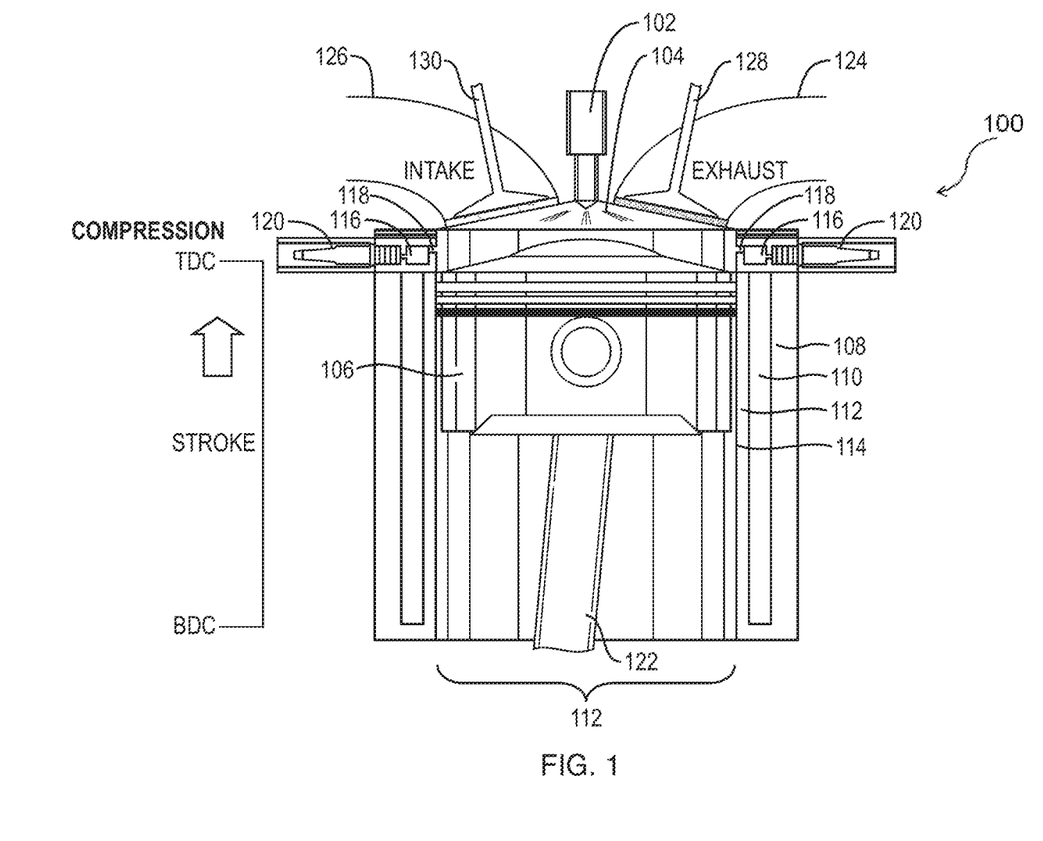
FIG. 1 is an example side view of a dual pre-chamber combustion system.

Referring now to FIG. 1, an example side view of a dual pre-chamber combustion system 100 is shown, according to various embodiments. As shown, combustion system 100 includes a cylinder block 108 through which a cylinder bore 112 is formed. As will be appreciated, cylinder block 108 may have any number of cylinder bores that are similar to cylinder bore 112. For example, cylinder block 108 may have a total of four cylinder bores when configured for use in a four cylinder engine. In some embodiments, cylinder block 108 may be formed using aluminum, an aluminum alloy, or other lightweight material. In such cases, cylinder bore 112 may include a cylinder liner 114 that is constructed using a suitable material, such as steel, to reinforce the interior of cylinder bore 112.

Cylinder block 108 may include a coolant jacket 110 that at least partially encapsulates cylinder bore 112. For example, as shown in greater detail in FIG. 2, coolant jacket 110 may be a hollow structure within cylinder block 108 that surrounds the circumference of cylinder bore 112 and provides liquid cooling to it. Any suitable form of coolant may be used within coolant jacket 110 such as water, ethylene glycol, combinations thereof, etc.

Located within cylinder bore 112 is a piston 106 that is driven by the combustion of an air-fuel mixture within system 100. Fuel 104 used as part of the mixture is injected by a centrally located fuel injector 102 that injects fuel 104 towards the center of cylinder bore 112. Said differently, fuel injector 102 may be located in combustion system 100 equidistant from all points along a circumference of cylinder bore 112 and injects fuel 104 in a direction perpendicular to a diameter of cylinder bore 112. Air may also be provided to cylinder bore 112 via an intake valve 130 that regulates the flow of air into cylinder bore 112 via an intake manifold 126. After combustion, the resulting gasses are vented away from cylinder bore 112 via an exhaust valve 128 that regulates the flow of exhaust gasses to an exhaust manifold 124.

As will be appreciated, piston 106 is connected to a crankshaft (not shown) via a piston rod 122 and helps to rotate the crankshaft through the movement of piston 106 within cylinder bore 112. During operation, piston 106 alternates between a top dead center (TDC) position (e.g., a topmost position of piston 106 within cylinder bore 112) and a bottom dead center (BDC) position (e.g., a bottommost position of piston 106 within cylinder bore 112) through the controlled operation of combustion system 100. For example, as shown in FIG. 1, piston 106 is depicted as moving upward towards its TDC position within cylinder bore 112.

According to various embodiments, cylinder block 108 also defines pre-chambers 116 in which combustion of at least a portion of fuel 104 (e.g., as part of an air-fuel mixture) takes place. For example, spark plugs 120 may be located within pre-chambers 116 and used to ignite a portion of the injected fuel 104 that has been mixed with air from air intake 126. In one embodiment, pre-chambers 116 are located on opposing sides of the circumference of cylinder bore 112, as part of a dual pre-chamber configuration. Each of pre-chambers 116 may also include any number of orifices/apertures 118 located along cylinder bore 112 that direct the ignited air-fuel mixture towards the center of cylinder bore 112. In other configurations, any number of pre-chambers may be located along the circumference of cylinder bore 112 at varying locations.

Figure 2:
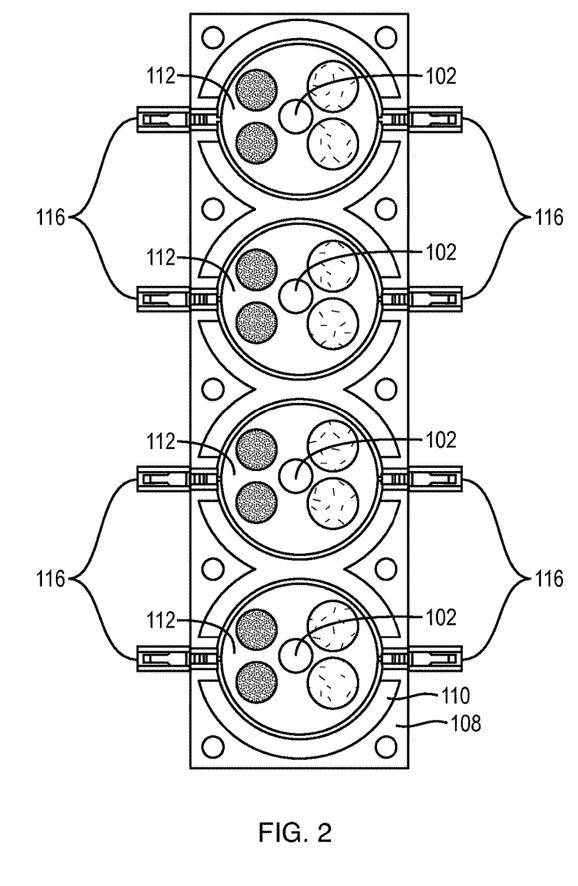
FIG. 2 is an example top view of a cylinder block having dual pre-chambers.

FIG. 2 illustrates an example top view of the cylinder block 108 shown in FIG. 1. In the example shown in FIG. 2, cylinder block 108 includes four cylinder bores 112, although any number of cylinders may be used in other embodiments. Also as shown, coolant jacket 110 formed in cylinder block 108 and at least partially encapsulates each of cylinder bores 112. At the top of each cylinder bore 112 is a centrally located fuel injector 102 that injects fuel downward into the cylinder bores 112. According to various embodiments, pre-chambers 116 are located on opposing sides of each of cylinder bores 112 to facilitate combustion within the bores. Said differently, each of cylinder bores 112 may have dual, diagonally opposing pre-chambers 116 located in their upper regions. During operation, fuel injected downward from fuel injectors 102 is mixed with intake air and at least a portion of the air-fuel mixture is received by pre-chambers 116, where combustion is initiated by spark plugs located within pre-chambers 116.

In general, the combustion system described herein follows a four stroke operation to drive the pistons of the engine. This operation generally includes an intake stroke, a compression stroke, a power stroke, and an exhaust stroke, which may be repeated any number of times during operation of the engine. Each of these phases of operation is described in greater detail below.

Figure 3A:
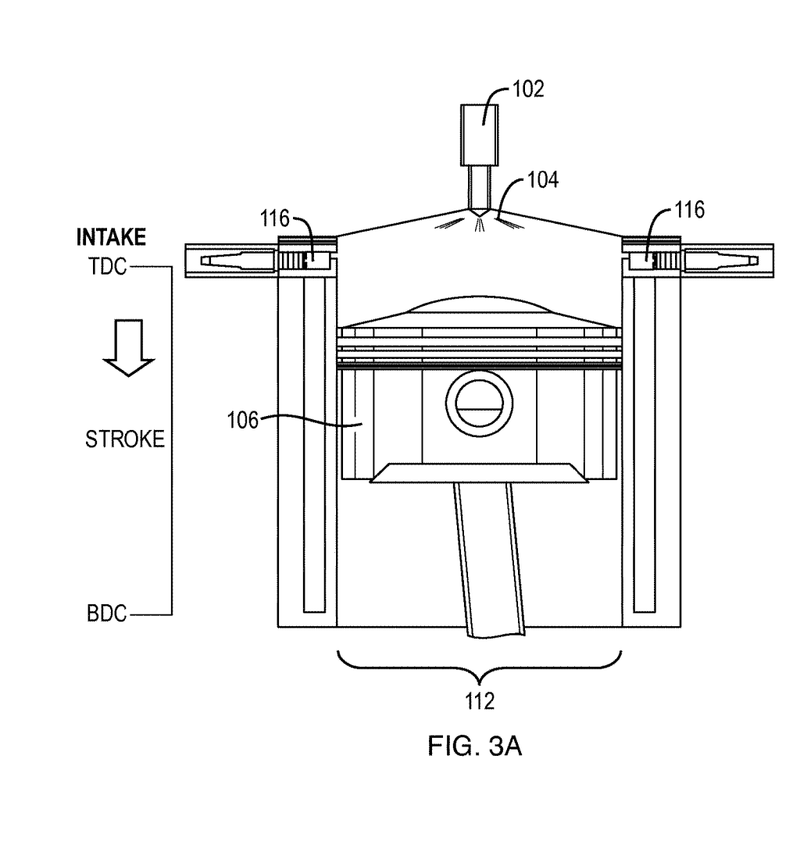
FIGS. 3A-3C illustrate examples of the system of FIG. 1 during an intake stroke.
Figure 3B:
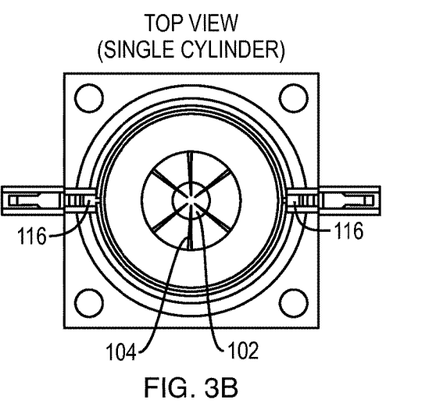
Figure 3C:
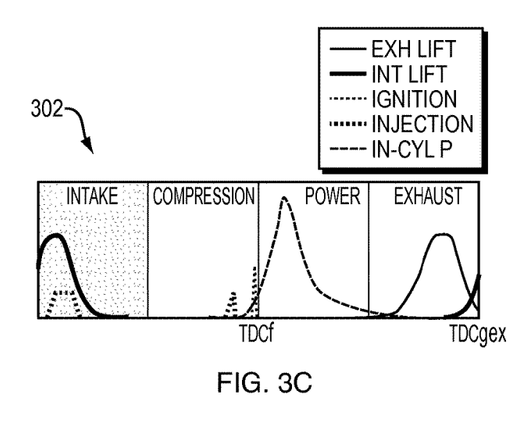

FIGS. 3A-3C illustrate examples of the combustion system 100 of FIG. 1 during an intake stroke, according to one embodiment. As shown in FIGS. 3A-3B, piston 106 is in the process of traveling from a TDC position to a BDC position within cylinder bore 112 during the intake stroke. At this time, fuel injector 102 provides an injection of fuel 104 into cylinder bore 112, which is used to form a primary air-fuel mixture within cylinder bore 112 (e.g., by mixing with air from air intake manifold 126). In various embodiments, the primary air-fuel mixture provided during the intake stroke is a lean mixture. A depiction of the operation of combustion system 100 during the injection stroke is shown in chart 302 in FIG. 3C. As shown in chart 302, the injection of fuel by fuel injector 102 is timed to coincide with the actuation of intake valve 130 (e.g., to provide air to cylinder bore 112), thereby filling cylinder bore 112 with the primary air-fuel mixture.

Figure 4A:
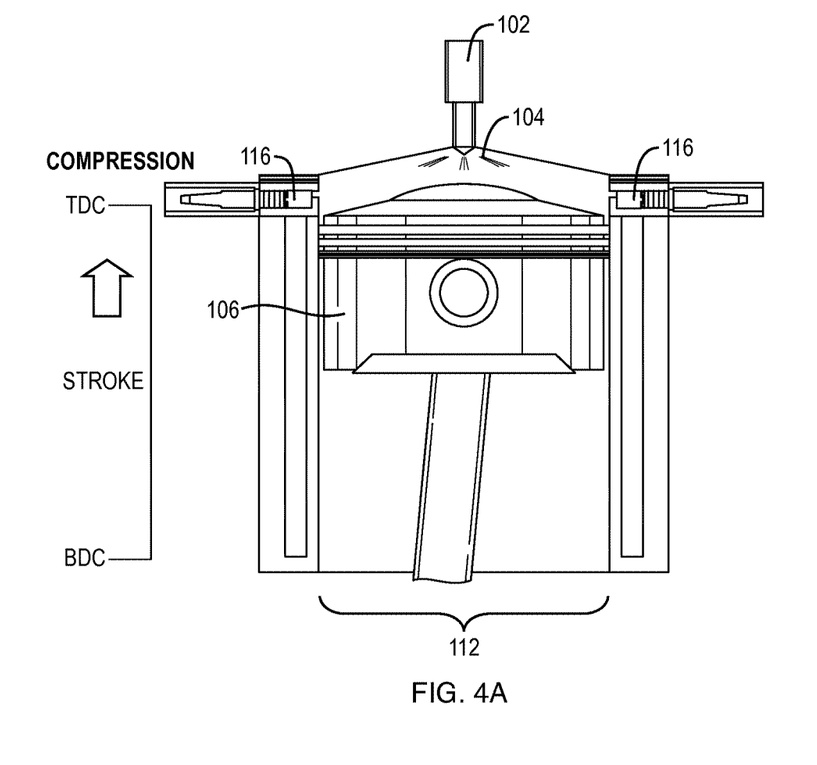
FIGS. 4A-4C illustrate examples of the system of FIG. 1 during a compression stroke.
Figure 4B:
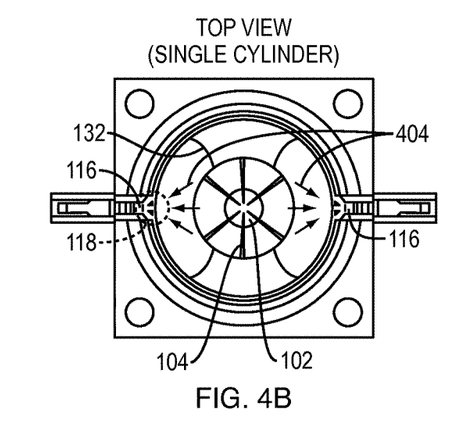

FIGS. 4A-4C illustrate examples of the combustion system 100 of FIG. 1 during a compression stroke, according to one embodiment. As shown in FIGS. 4A-4B, piston 106 returns from its BDC position (e.g., after completing the intake stroke) and travels back to its TDC position during the compression stroke. This motion has a compressive effect on the primary air-fuel mixture previously injected into cylinder bore 112 during the intake stroke depicted in FIGS. 3A-3C.

According to various embodiments, fuel injector 104 may provide another injection of fuel 104 into cylinder bore 112 as piston 106 approaches its TDC position during the compression stroke. In other words, fuel injector 102 may provide two separate injections of fuel 104 during any given operational cycle (e.g., during both intake and compression strokes). During the compression stroke injection, the location of piston 112 being in close proximity to pre-chambers 116 helps to direct the injected fuel 104 towards pre-chambers 116. For example, as shown in FIG. 4B, the injected fuel 104 may form inflow streams 404 along crown 132 of piston 106 during the second injection. In various embodiments, crown 132 may be contoured to direct the flow of fuel 104 towards pre-chambers 116. For example, crown 132 may include grooves or other contours that facilitate the formation of fuel streams 404 towards pre-chambers 116. Thus, piston 106 provides a wall guided motion during this injection to fill each of pre-chambers 116 with an air-fuel charge from the second fuel injection. In one embodiment, each of pre-chambers 116 includes a plurality of apertures 118 through which fuel 104 is received. For example, as shown, each of pre-chambers 116 includes three apertures 118, although any number of apertures may be used in other embodiments.

Figure 4C:
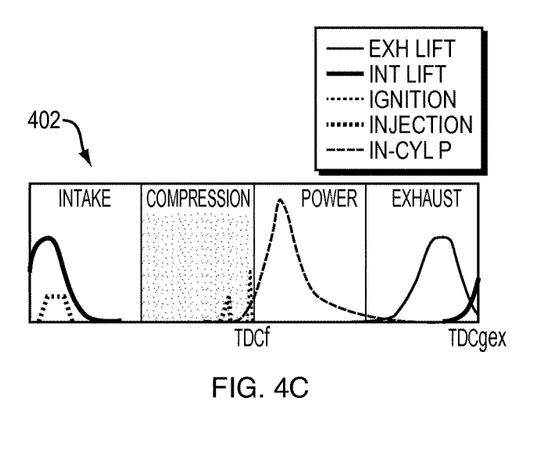

A depiction of the operation of combustion system 100 during the compression stroke is shown in chart 404 of FIG. 4C. As shown in chart 402, the injection of fuel that takes place during the compression stroke may be of shorter duration than that of the injection during the intake stroke, in one embodiment. In other words, a smaller amount of fuel may be injected during the compression stroke for the purpose of directing a combustible mixture into the opposing pre-chambers 116 in cylinder bore 112.

Figure 5A:
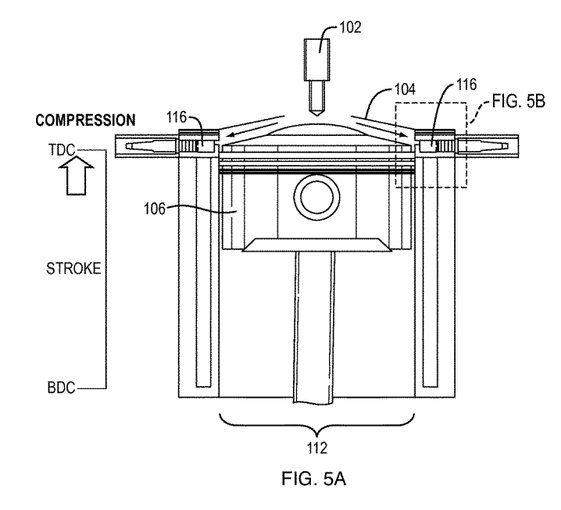
FIGS. 5A-5C illustrate examples of the system of FIG. 1 as the piston approaches top dead center during a compression stroke.
Figure 5B:
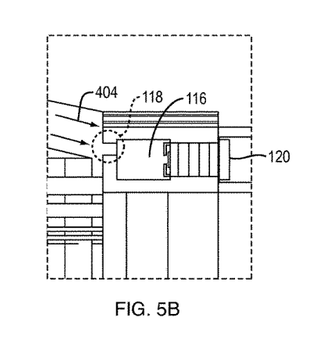
Figure 5C:
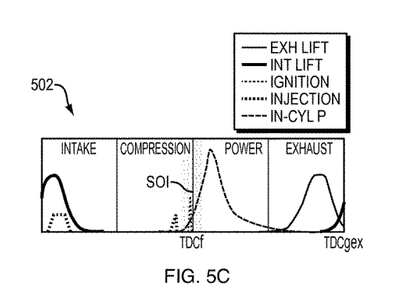

FIGS. 5A-5C illustrate examples of the combustion system 100 of FIG. 1 as piston 106 approaches its TDC position during the compression stroke. As shown in FIGS. 5A-5B, the air-fuel charge from fuel streams 404 is compressed through apertures 118 and into pre-chambers 116 by the motion of piston 106. In one embodiment, each of apertures 118 is approximately one millimeter in diameter. At the TDC position, the top ring land area of piston 106 may also clear pre-chambers 116. Typical engines often have 5-8 millimeters of clearance in this region.

A depiction of the operation of combustion system 100 during the end of the compression stroke is shown in chart 502 of FIG. 5C. As shown in chart 502, a start of ignition (SOI) event may occur towards the end of the compression stroke, thereby leading into the power stroke. During the SOI event, the spark plugs 120 located in each of pre-chambers 116 are energized leading to the ignition of the air-fuel mixtures in pre-chambers 116 and the start of the power stroke phase of operation.

Figure 6A:
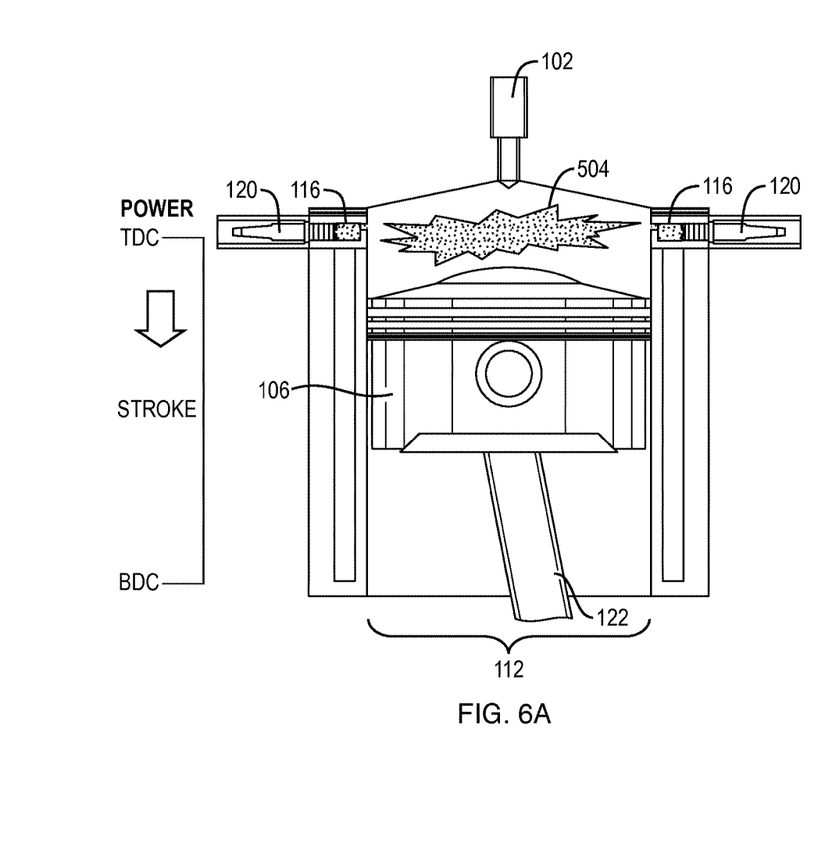
FIGS. 6A-6C illustrate examples of the system of FIG. 1 during an ignition-power event.
Figure 6B:
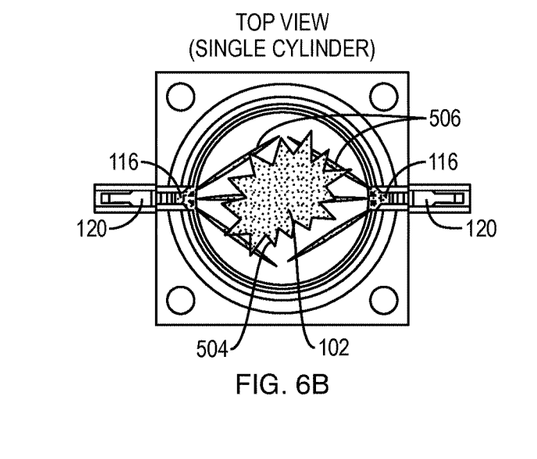
Figure 6C:
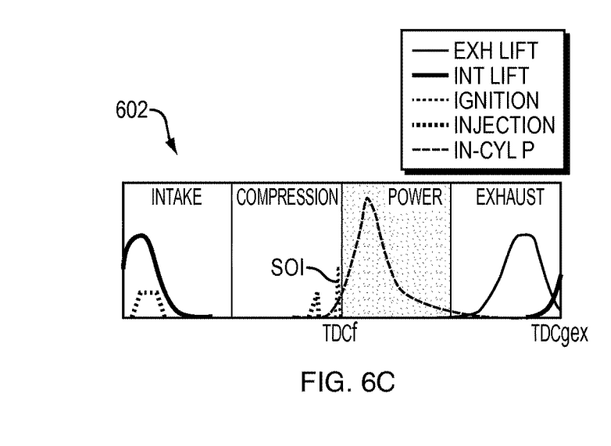

FIG. 6A-6C illustrate examples of the combustion system 100 of FIG. 1 during an ignition-power event, such as that occurring at the start of the power stroke. As shown in FIGS. 6A-6B, spark plugs 120 are activated during this event, thereby igniting the air-fuel mixtures within pre-chambers 116. As a result of this ignition, ignition flames 506 are directed back towards cylinder bore 112. In contrast to other pre-chamber designs, the direction of flames 506 back towards the center of cylinder bore 112 avoids impinging on the walls of cylinder bore 112. Flames 506 operate in a jet-like manner, thereby providing a strong primary flame kernel 504 within the center of cylinder bore 112. In one embodiment, apertures 118 are formed to provide flames 506 at fifteen or more degrees of separation between each other into cylinder bore 112. As shown, for example, each of pre-chambers 116 may provide three flames 506 into cylinder bore 112 via apertures 118 as a result of igniting the air-fuel mixtures in pre-chambers 116. As will be appreciated, flames 506 and the formation of flame kernel 504 have the effect of combusting the primary air-fuel mixture present within cylinder bore 112. The energy released from this combustion drives piston 106 away from its TDC position back towards its BDC position as part of the power stroke phase of operation.

A depiction of the operation of combustion system 100 during the power stroke phase of operation is shown in chart 602 of FIG. 6C. As shown in chart 602, the combustion of the primary air-fuel mixture within cylinder bore 112 through ignition of the mixtures in pre-chambers 116 provides power to piston 106. This power is transferred to piston rod 122 which, in turn, is transferred into rotational force applied to the crankshaft of the engine.

Also as shown in chart 602, an exhaust stroke occurs after piston 106 reaches its BDC position within cylinder bore 112 and returns back towards its TDC position (e.g., after completion of the power stroke). During the exhaust stroke, exhaust valve 128 is actuated to allow exhaust gasses that result from the combustion to be released into exhaust manifold 124 and removed from cylinder bore 112. Also at the tail end of this phase, intake valve 130 is actuated, to allow a fresh charge of air to enter cylinder bore 112 via intake manifold 126, leading into the start of a new intake stroke phase of operation.

Advantageously, the techniques described herein provide for a combustion system that supports the use of very lean air-fuel mixtures, thereby improving fuel economy and reducing the emission of NOx gasses. Such techniques have been shown to improve fuel economy by 5-10% over other stoichiometric combustion systems by reducing pumping losses. In addition, the production of NOx gasses has been shown to decrease significantly through the use of a lean air-fuel mixture. Further, the techniques herein provide a simpler design than that of traditional pre-chamber systems that use both a fuel injector and spark plug within the pre-chamber itself.

While the embodiment of the present disclosure has been described in detail, the scope of the right of the present disclosure is not limited to the above-described embodiment, and various modifications and improved forms by those skilled in the art who use the basic concept of the present disclosure defined in the appended claims also belong to the scope of the right of the present disclosure.

What is claimed is:

1. A combustion system for an engine comprising:
a cylinder block that defines a cylinder bore and opposing pre-chambers located along a circumference of the cylinder bore;
a fuel injector located equidistant from the circumference of the cylinder bore that injects fuel in a direction perpendicular to a diameter of the cylinder bore;
a piston located in the cylinder bore that directs the fuel from the fuel injector toward the pre-chambers, the piston configured to move between top and bottom positions within the cylinder bore by operation of the combustion system; and
spark plugs located within the pre-chambers that ignite at least a portion of the fuel from the fuel injector to direct ignition flames into the cylinder bore.

2. The system as in claim 1, wherein the pre-chambers comprise a plurality of apertures that direct the ignition flames into the cylinder bore.

3. The system as in claim 2, wherein the apertures are each approximately one millimeter in diameter.

4. The system as in claim 1, wherein the ignition flames from a particular pre-chamber are spaced fifteen or more degrees apart.

5. The system as in claim 1, wherein the cylinder block defines a coolant jacket that at least partially surrounds the cylinder bore.

6. The system as in claim 5, wherein the pre-chambers are located along a circumference of the cylinder bore at locations that correspond to a top dead center position of the piston.

7. A method comprising:
injecting, by a fuel injector located centrally within a cylinder bore of an engine, a first injection of fuel towards a crown of a piston located within the cylinder bore during an intake stroke in which the piston is moving away from the fuel injector in the cylinder bore, the piston directing the fuel from the fuel injector toward opposing pre-chambers located along a circumference of the cylinder bore, the piston configured to move between top and bottom positions within the cylinder bore by operation of a combustion system of the engine;
receiving at least a portion of the first injection of fuel at the opposing pre-chambers;
igniting the portion of the first injection of fuel within the pre-chambers to direct ignition flames into the cylinder bore; and
injecting, by the fuel injector, a second injection of fuel during a compression stroke in which the piston is moving toward the fuel injector in the cylinder bore,
wherein the fuel is primarily injected during the intake stroke to form a primary air-fuel mixture, and the fuel is secondarily injected during the compression stroke and guided toward the opposing pre-chambers to be ignited therein.

8. The method as in claim 7, wherein the injection of fuel is injected during a compression stroke in which the piston is moving towards a top dead center position in the cylinder bore.

9. The method as in claim 8, further comprising:
using the crown of the piston to direct the injection of fuel towards the pre-chambers.

10. The method as in claim 9, further comprising:
using the crown of the piston to force the injection of fuel into the pre-chambers as the piston nears the top dead center position.

11. The method as in claim 7, wherein the intake stroke occurs prior to the compression stroke.

12. The method as in claim 11, wherein the ignition flames directed from a particular pre-chamber are spaced at least fifteen degrees apart.

13. The method as in claim 11, further comprising:
using the ignition flames from the pre-chambers to ignite at least a portion of the first injection of fuel within the cylinder bore.

14. The method as in claim 7, further comprising:
providing cooling to the cylinder bore using a cooling jacket that at least partially surrounds the cylinder bore.

* * * * *